(12) United States Patent
Schwartz et al.

(10) Patent No.: US 9,405,664 B2
(45) Date of Patent: Aug. 2, 2016

(54) AUTOMATING SOFTWARE TESTING

(75) Inventors: Dror Schwartz, Holon (IL); Moshe Eran Kraus, Mazkeret Batya (IL); Sagi Monza, Rishon-Lezion (IL); Ido Berkovitch, Tel Aviv (IL); Ithai Levi, Shoham (IL)

(73) Assignee: Hewlett Packard Enterprise Development LP, Houston, TX (US)

( * ) Notice: Subject to any disclaimer, the term of this patent is extended or adjusted under 35 U.S.C. 154(b) by 708 days.

(21) Appl. No.: 13/222,182

(22) Filed: Aug. 31, 2011

(65) Prior Publication Data

US 2013/0055218 A1    Feb. 28, 2013

(51) Int. Cl.
*G06F 9/44* (2006.01)
*G06F 11/36* (2006.01)

(52) U.S. Cl.
CPC ........ *G06F 11/3688* (2013.01); *G06F 11/3692* (2013.01); *G06F 11/3604* (2013.01); *G06F 11/3676* (2013.01)

(58) Field of Classification Search
CPC .................................................. G06F 11/3688
USPC ....................................................... 717/131
See application file for complete search history.

(56) References Cited

U.S. PATENT DOCUMENTS

| | | | | |
|---|---|---|---|---|
| 5,214,780 A * | 5/1993 | Ingoglia et al. | | 718/106 |
| 7,055,137 B2 * | 5/2006 | Mathews | | G06F 11/3688 714/46 |
| 7,080,357 B2 * | 7/2006 | Foster et al. | | 717/126 |
| 7,093,249 B2 * | 8/2006 | Melamed et al. | | 718/100 |
| 7,142,960 B2 * | 11/2006 | Grier et al. | | 701/29.1 |
| 7,418,693 B1 | 8/2008 | Gennari et al. | | |
| 7,490,307 B2 | 2/2009 | Fomaciari et al. | | |
| 7,543,000 B2 * | 6/2009 | Castro | | G06F 17/30578 |
| 7,584,278 B2 | 9/2009 | Rajarajan et al. | | |
| 7,624,380 B2 | 11/2009 | Okada | | |
| 7,958,497 B1 * | 6/2011 | Lindo | | G06F 11/3636 714/799 |
| 8,935,669 B2 * | 1/2015 | Neethiraj | | G06F 11/2294 717/124 |
| 2002/0028430 A1 | 3/2002 | Driscoll et al. | | |
| 2003/0191729 A1 | 10/2003 | Siak et al. | | |
| 2004/0103396 A1 * | 5/2004 | Nehab | | G06F 11/3684 717/127 |
| 2007/0006036 A1 * | 1/2007 | Devas et al. | | 714/38 |
| 2009/0100345 A1 * | 4/2009 | Miller | | 715/738 |
| 2009/0106737 A1 * | 4/2009 | Chockler | | G06F 11/3676 717/126 |
| 2009/0125889 A1 * | 5/2009 | Imaeda et al. | | 717/129 |

OTHER PUBLICATIONS

Edeilstein et al; "Multithreaded Java program test generation"; 2002; IBM; 15 pages.*

* cited by examiner

*Primary Examiner* — Wei Zhen
*Assistant Examiner* — Brahim Bourzik
(74) *Attorney, Agent, or Firm* — Hewlett Packard Enterprise Patent Department

(57) ABSTRACT

A system and method of automating software testing is provided. The system and method may determine whether some of a plurality of anchor points within application instructions is triggered in response to input from a current operation within operation instructions. If some of the plurality of anchor points is triggered, one of the triggered anchor points may be selected. Instructions may be generated that configure a given processor to pause after the current operation until the selected one of the triggered anchor points completes.

20 Claims, 5 Drawing Sheets

AUTOMATING SOFTWARE TESTING

BACKGROUND

Test automation allows software engineers to record and replay operations in order to determine whether their applications respond accordingly. These tools alleviate manual testing, which is often laborious and time-consuming. For example, automation software may record and replay user interactions with a graphical user interface ("GUI"). Web developers may use automation tools to record and replay mouse input (e.g., points and clicks) and web page navigations. Furthermore, automation tools may compare predicted output with actual output or initiate testing preconditions. A quality replay of recorded operations ensures accurate execution and timing of each operation.

DETAILED DESCRIPTION

Introduction:

Various examples disclosed herein provide an apparatus and method to ensure accurate timing of application test automation. In one aspect, application instructions may contain a plurality of anchor points. Each anchor point may be a module within the application instructions that processes a type of input. In a further aspect, operation instructions may be provided to forward input to the application instructions. The application instructions and the operation instructions may be executed so as to test the responses by the application instructions. In one example, it may be determined whether at least some of the plurality of anchor points is triggered in response to input from a current operation within the operation instructions. If at least some of the plurality of anchor points is triggered, one of the triggered anchor points may be selected. The selected anchor point may be the one anchor point having the highest impact on the synchronicity between the current operation and one or more subsequent operations. Instructions may be generated that configure a given processor to pause until the selected anchor point terminates.

In a further aspect, each of the plurality of anchor points may be associated with a coherency factor. A coherency factor, as defined herein, represents a probability that a given anchor point will be triggered in response to repeated executions of the operation instructions. An auxiliary factor may be determined for each triggered anchor point. An auxiliary factor, as defined herein, represents the reliance by one or more subsequent operations on a given anchor point such that one or more subsequent operations cannot begin until the given anchor point is complete. The coherency factor and the auxiliary factor of each triggered anchor point may be used so as to calculate a weight thereof. Such may be accomplished, at least in part, by adding the two factors. The selected anchor point may be the anchor point having the highest weight of the triggered anchor points.

The aspects, features and advantages of the application will be appreciated when considered with reference to the following description of examples and accompanying figures. The following description does not limit the application; rather, the scope of the application is defined by the appended claims and equivalents. The present application is divided into sections. The first, labeled "Components," describes examples of various physical and logical components for implementing aspects of the present application. The second section, labeled "Operation," discloses a working example of the apparatus and method. Finally, the section labeled "Conclusion" summarizes the application.

Figure 1:
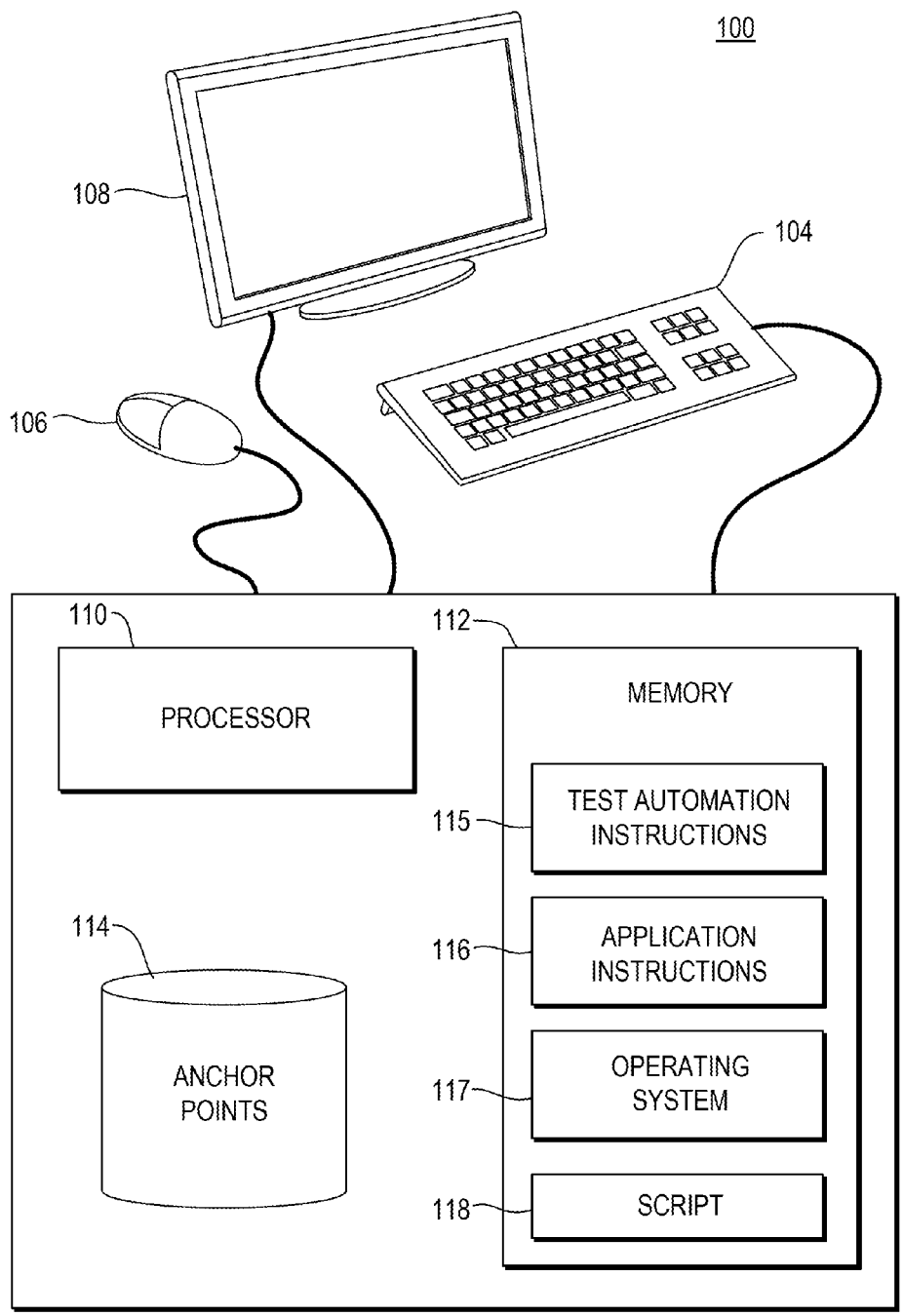
FIG. 1 is a close up illustration of a computer apparatus in accordance with aspects of the application.

Components:

FIG. 1 presents a schematic diagram of an illustrative computer apparatus 100 depicting various components in accordance with aspects of the application. The computer apparatus 100 may include all the components normally used in connection with a computer. For example, it may have a keyboard 104 and mouse 106 and/or various other types of input devices such as pen-inputs, joysticks, buttons, touch screens, etc., as well as a display 108, which could include, for instance, a CRT, LCD, plasma screen monitor, TV, projector, etc. Computer apparatus 100 may also comprise a network interface (not shown) to communicate with other devices over a network using conventional protocols (e.g., Ethernet, Wi-Fi, Bluetooth, etc.).

The computer apparatus 100 may also contain a processor 110 and memory 112. Memory 112 may store instructions that may be retrieved and executed by processor 110. In one example, memory 112 may be a random access memory ("RAM") device. In a further example, memory 112 may be divided into multiple memory segments organized as dual in-line memory modules (DIMMs). Alternatively, memory 112 may comprise other types of devices, such as memory provided on floppy disk drives, tapes, and hard disk drives, or other storage devices that may be coupled to computer apparatus 100 directly or indirectly. The memory may also include any combination of one or more of the foregoing and/or other devices as well. The processor 110 may be any number of well known processors, such as processors from Intel® Corporation. In another example, the processor may be a dedicated controller for executing operations, such as an application specific integrated circuit ("ASIC").

Although all the components of computer apparatus 100 are functionally illustrated in FIG. 1 as being within the same block, it will be understood that the components may or may not be stored within the same physical housing. Furthermore, computer apparatus 100 may actually comprise multiple processors and memories working in tandem.

The instructions residing in memory 112 may comprise any set of instructions to be executed directly (such as machine code) or indirectly (such as scripts) by the processor (s). In that regard, the terms "instructions," "steps" and "programs" may be used interchangeably herein. The instructions may be stored in any computer language or format, such as in object code or modules of source code. Furthermore, it is understood that the instructions may be implemented in the form of hardware, software, or a combination of hardware and software and that the examples herein are merely illustrative.

In one example, the instructions may be part of an installation package that may be executed by processor 110. In this example, memory 112 may be a portable medium such as a CD, DVD, or flash drive or a memory maintained by a server from which the installation package can be downloaded and installed. In another example, the instructions may be part of an application or applications already installed. Here, memory 112 can include integrated memory such as a hard drive.

In FIG. 1, the executable program instructions stored in memory 112 may include test automation instructions 115 and application instructions 116. Test automation instructions 115 may configure processor 110 to record operations that interact with application instructions 116, which may be the subject of quality assurance testing. Test automation instructions 115 may also replay the recorded operations. As will be discussed in more detail below, test automation instructions 115 may also be executed in a learning mode to determine the correct timing of the operations. Memory 112 is shown to include operating system 117. Operating system 117 represents a collection of programs that when executed by processor 110 serve as a platform on which test automation instructions 115 and application instructions 116 can execute. Examples of operating systems include, but are not limited, to various versions of Microsoft's Windows® and Linux®.

Test automation instructions 115 may record operations into a script 118, from which they can be executed repeatedly by processor 110, in accordance with test automation instructions 115. An operation may be a mouse click, a keyboard entry, or a receipt of data from another process. The input from these operations may trigger an anchor point within application instructions 116. As noted above, an anchor point is defined herein as a module within application instructions 116 that processes a specific type of input (e.g., event handler instructions, interrupt handler instructions, etc.).

A triggered anchor point may be, for example, web page navigation, the opening of a dialog box, the changing of an object's property, the rendering of a web page, or the start/termination of network activity. One or more anchor points may be triggered in response to an operation recorded in script 118. For example, a mouse click operation may trigger web page navigation and the rendering of a web page. Each anchor point may be associated with a coherency factor. A coherency factor, as defined herein, is the probability that a given anchor point will be triggered by repeated executions of operation instructions, such as the operations recorded in script 118. The associations between an anchor point and a coherency factor may be predetermined by an administrator and stored in anchor point database 114, which is not limited by any particular data structure. The associations may be stored in computer registers, in a relational database as a table having a plurality of different fields and records, XML documents, or flat files. The association data may also be formatted in any computer-readable format. In one example, the data may comprise any information sufficient to identify the relevant information, such as numbers, descriptive text, proprietary codes, or references to data stored in other areas of the same memory or different memories (including other network locations). In another example, anchor point database 114 may be in a location physically remote from, yet still accessible by, the processor 110.

Synchronicity, as defined herein, is the correct timing of each operation and anchor point in a series of operations and anchor points. Conventional test automation tools often execute recorded operations without adequate attention to synchronicity. As such, these conventional tools frequently execute operations out of sequence with respect to the anchor points. This disruption in synchronicity leads to test results that do not reflect actual conditions. In accordance with one aspect of the application, test automation instructions 115 may also be executed in a learning mode. During the learning mode, the operations in script 118 may be executed and monitored. In addition, the responding anchor points may be monitored. Test automation instructions 115 may gather attributes associated with each operation and a responding anchor point. Some examples of attributes may be the amount of time elapsed before an anchor point was reached, the kind of operation that triggered the anchor point, whether a subsequent operation is ready to execute, or the time duration of an anchor point. These attributes may be utilized to determine an auxiliary factor. An auxiliary factor is defined herein as the reliance by one or more subsequent operations upon the completion of a given anchor point. For example, if a subsequent operation in script 118 cannot begin until a current anchor point completes, the anchor point will have a high auxiliary factor. The auxiliary factor may be even higher if two subsequent operations rely upon completion of a given anchor point. Test automation instructions 115 may utilize the auxiliary factor and the coherency factor to determine the timing of each operation in script 118.

Figure 2:
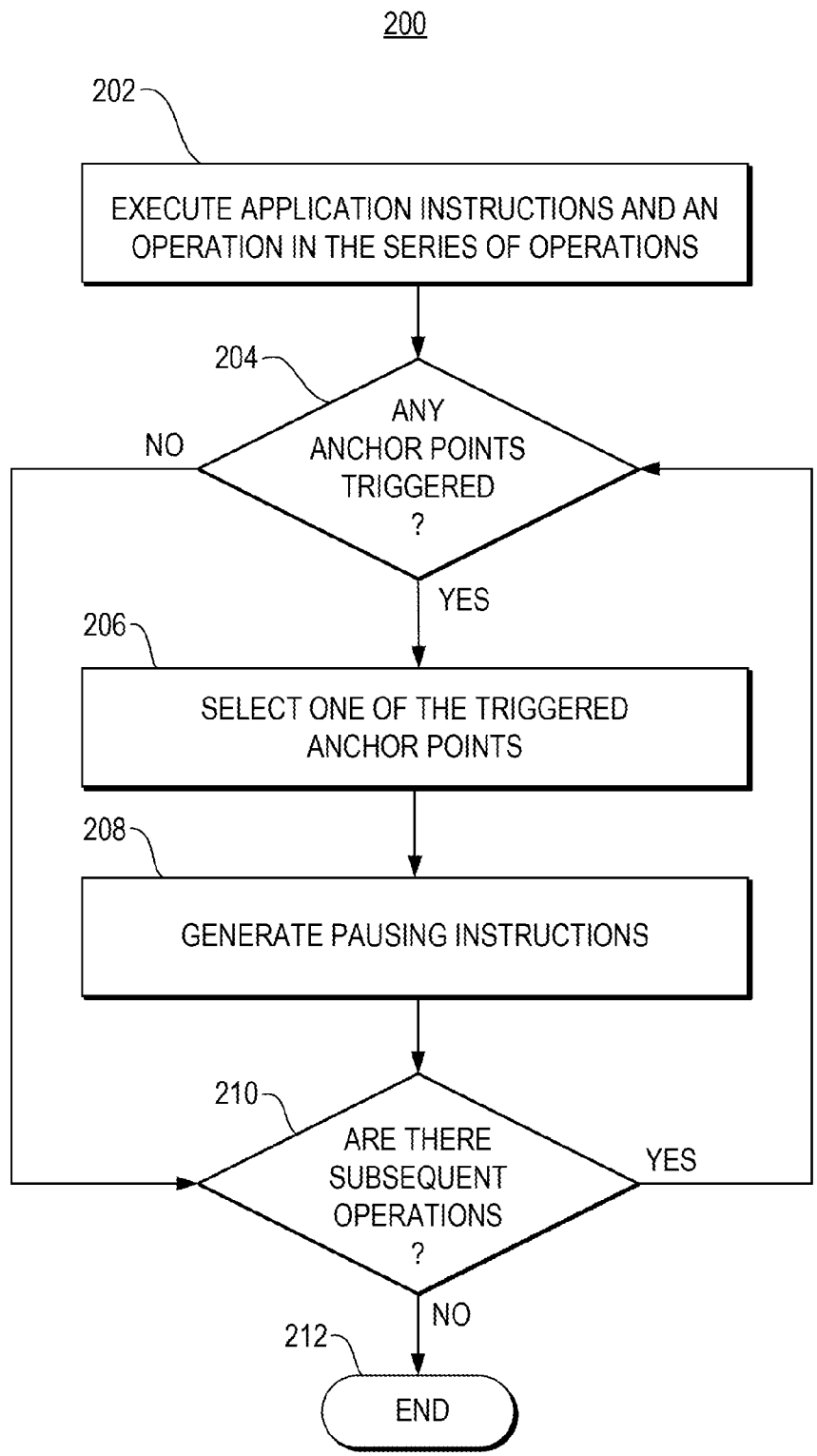
FIG. 2 is a flow diagram in accordance with aspects of the application.
Figure 3:
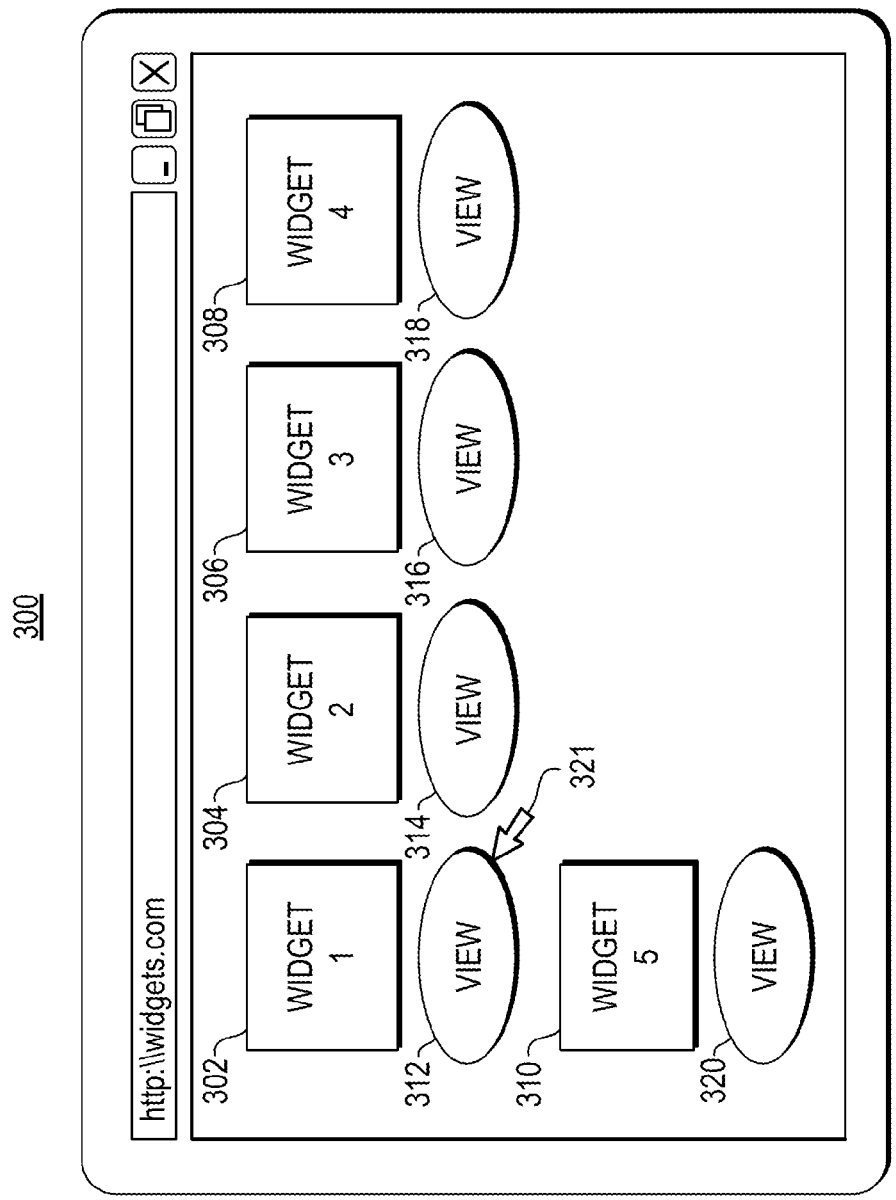
FIG. 3 is a working example of test automation software executing in a learning mode.
Figure 4:
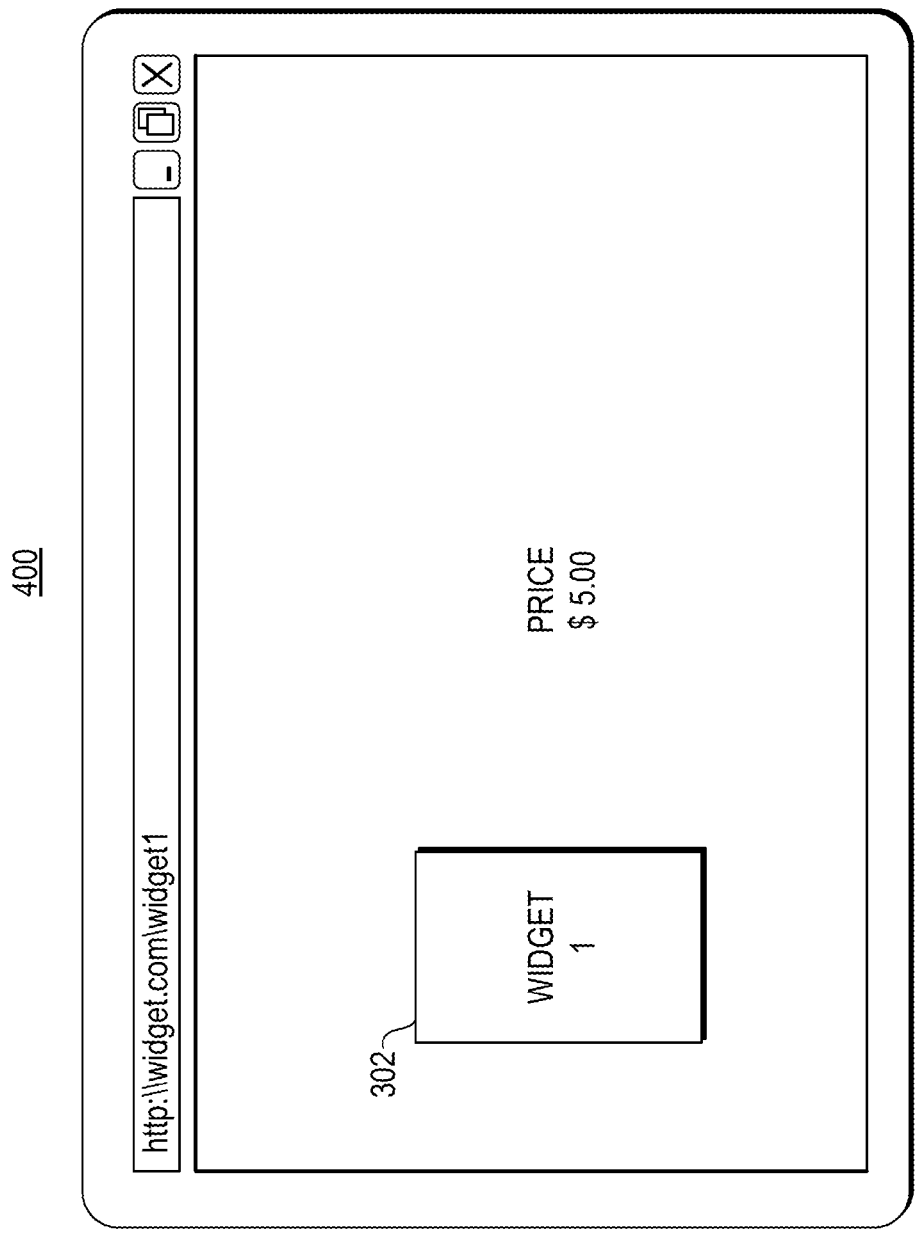
FIG. 4 is a further working example of test automation software executing in a learning mode.
Figure 5:
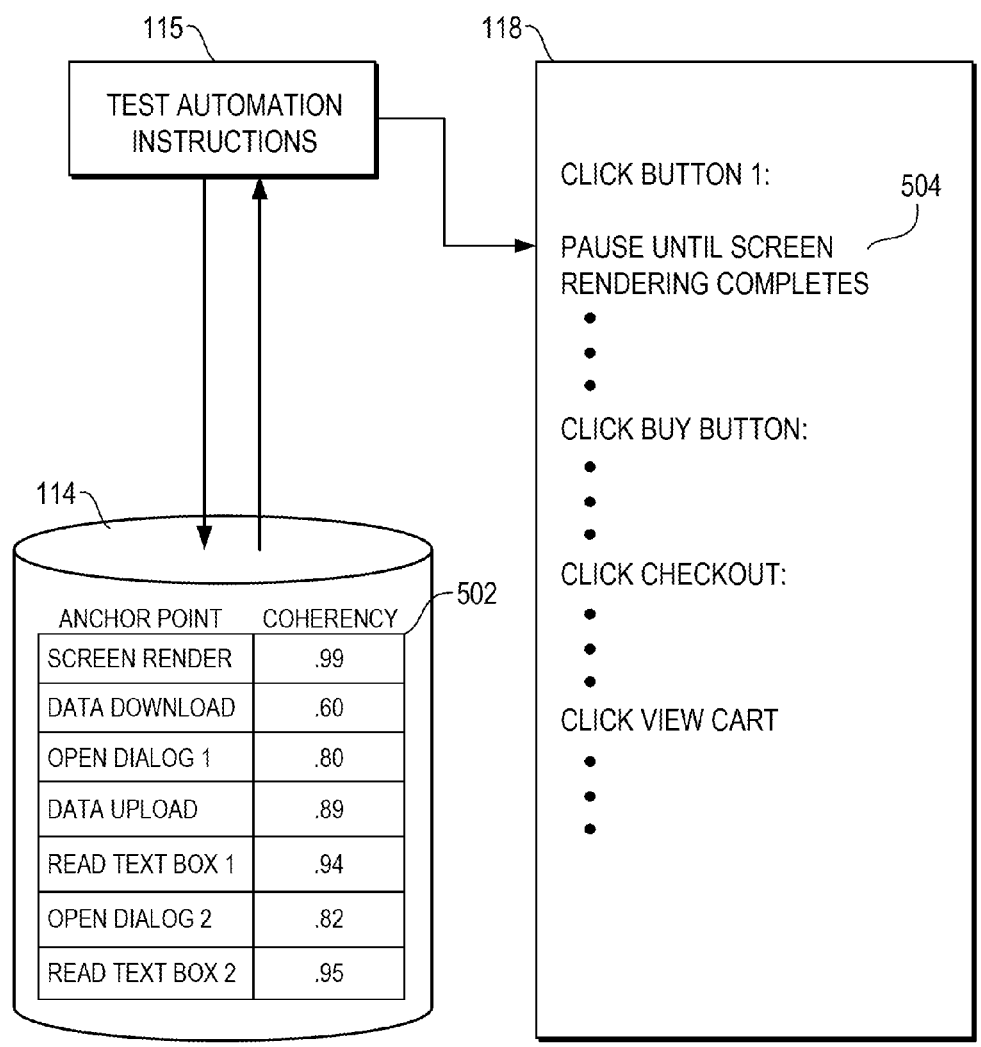
FIG. 5 is a working example of instructions being generated in accordance with aspects of the application.

Operation:

One working example of the apparatus and method is shown in FIGS. 2-5. In particular, FIG. 2 illustrates a flow diagram of a process for determining the timing of each operation. FIGS. 3-4 show illustrative screen shots of test automation instructions executing in a learning mode. FIG. 5 illustrates the generation of timing instructions. The actions shown in FIGS. 3-5 will be discussed below with regard to the flow diagram of FIG. 2.

As shown in block 202 of FIG. 2, an operation and the application instructions may be executed. The operation may be executed by test automation instructions 115 and may have been pre-recorded thereby in script 118. A user may execute test automation instructions 115 in recording mode or learning mode by, for example, setting a parameter in test automation instructions 115. FIG. 3 illustrates an illustrative screen shot 300 of application instructions 116 being executed by test automation instructions 115 in learning mode. In the example of FIG. 3, application instructions 116 is an e-commerce web application. Screen shot 300 may have images 302-310 of widgets being offered for sale. Each image 302-310 may have a corresponding view button 312-320 respectively. The first operation in script 118 may be to click button 312 with cursor 321, as shown in FIG. 3. Referring back to FIG. 2, test automation instructions 115 may determine if at least some of the plurality of anchor points is triggered by the current operation, as shown in block 204. The clicking of button 312 may trigger two anchor points. The first anchor point may be a load of data from a network and the second anchor point may be the rendering of a web page on a screen. Any anchor points not reached by the operation may be deemed irrelevant for the current operation and ignored. As noted above, each anchor point may be associated with a coherency factor that may be, for example, a percentage. The rendering of the web page may have a ninety-nine percent probability of being triggered on recurring executions of the operations in script 118. The loading of data from a network may have a sixty percent probability of being triggered, since the necessary data may be cached, rendering a network download obsolete.

Referring back to FIG. 2, if at least some of the plurality of anchor points is triggered by the current operation, one of the triggered anchor points may be selected, as shown in block 206. The selected anchor point may be the one having the highest impact on the synchronicity between the current operation and one or more subsequent operations. In selecting an anchor point, an auxiliary factor may be determined for each triggered anchor point. The auxiliary factor derived for each triggered anchor point may be based on the aforementioned attributes gathered during learning mode execution of test automation instructions 115. The attributes may be associated with each anchor point or each operation recorded in script 118. FIG. 4 illustrates a second screen shot 400, which is partially rendered as a result of pressing button 312 of FIG. 3. FIG. 4 shows an enlarged image 302 of the widget and its price of $5.00. A subsequent operation may be to click a buy button, which should be rendered on screen shot 400. However, because the button is not yet displayed, the execution of the subsequent clicking operation should be postponed until the button is shown. Without the postponement, test automation instructions 115 will execute the second click operation and advance to the next operation, which may be a click of the checkout button. Thus, subsequent operations rely on the complete display of screen shot 400. In view of the reliance by subsequent operations, the screen rendering anchor point may be assigned a high auxiliary factor, such as ninety nine percent.

A weight may be calculated for each triggered anchor point. In one example, the weight may be the sum of the coherency factor and the auxiliary factor. The triggered anchor point having the highest weight may be selected. In the example of FIGS. 3-4, the screen rendering anchor point may be selected for the first click operation, since it has a coherency factor and an auxiliary factor of ninety-nine percent. In block 208 of FIG. 2, instructions may be generated that configure a given processor to pause until the selected anchor point completes. Test automation instructions 115 may write these pausing instructions into script 118 and may execute them during replay mode.

FIG. 5 illustrates the generation of the pausing instructions. Anchor point database 114 is shown having an anchor point table 502 that stores associations between anchor points and coherency factors. Script 118 is shown with a series of operations that may have been pre-recorded by a user with test automation instructions 115 in recording mode. When the automation instructions are executed in learning mode, the operations stored in script 118 may be replayed in the order in which they were stored. Furthermore, test automation instructions 115 may insert additional pausing instructions in view of the gathered attributes. In the example of FIG. 5, test automation instructions 115 generate instructions 504 to pause until the screen rendering anchor point completes. After completion, test automation instructions 115 may advance to the subsequent operation and determine if additional pausing instructions should be generated.

Referring back to FIG. 2, test automation instructions 115 may determine if there are subsequent operations in script 118, as shown in block 210. If there are subsequent operations in script 118, test automation instructions 115 may return to block 204. Otherwise, the test automation instructions 115 may terminate processing in block 212.

The examples disclosed above may be realized in any computer-readable media for use by or in connection with an instruction execution system such as a computer/processor based system, an ASIC, or other system that can fetch or obtain the logic from computer-readable media and execute the instructions contained therein. "Computer-readable media" can be any media that can contain, store, or maintain programs and data for use by or in connection with the instruction execution system. Computer readable media may comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, RAM, a read-only memory ("ROM"), an erasable programmable read-only memory, or a portable compact disc.

CONCLUSION

Advantageously, the above-described apparatus and method monitor various anchor points triggered during test automation to enhance the synchronicity between recorded operations. In this regard, the testing environment reflects actual conditions. In turn, quality assurance testers can rely on test results generated by test automation software.

Although the disclosure herein has been described with reference to particular examples, it is to be understood that these examples are merely illustrative of the principles of the disclosure. It is therefore to be understood that numerous modifications may be made to the examples and that other arrangements may be devised without departing from the spirit and scope of the application as defined by the appended claims. Furthermore, while particular processes are shown in a specific order in the appended drawings, such processes are not limited to any particular order unless such order is expressly set forth herein. Rather, processes may be performed in a different order or concurrently.

The invention claimed is:

1. A system for automating software testing, the system comprising
a processor configured to:
determine whether a plurality of anchor points included within application instructions are triggered in response to input from a current operation within operation instructions;
if the plurality of anchor points is triggered, select one of the triggered anchor points that has a highest impact on a synchronicity between the current operation and one or more subsequent operations in the operation instructions based on a coherency factor of the one anchor point, the coherency factor representing a probability that the one anchor point will be triggered in response to repeated executions of the application instructions; and
generate instructions that configure the processor to pause, after the current operation completes, until the selected one anchor point completes, before advancing to the one or more subsequent operations.

2. The system of claim 1, wherein the processor is configured to determine an auxiliary factor for the one anchor point, the auxiliary factor representing a reliance by the one or more subsequent operations on the one anchor point, such that the one or more subsequent operations cannot begin until the one anchor point is complete.

3. The system of claim 2, wherein the processor is configured to use the coherency factor and the auxiliary factor of the one anchor point to calculate a weight for the one anchor point.

4. The system of claim 3, wherein the selected one anchor point has a highest weight of the triggered anchor points.

5. The system of claim 4, wherein the processor is configured to gather attributes associated with the plurality of anchor points.

6. The system of claim 5, wherein the attributes comprise timing information associated with, the one anchor point.

7. The system of claim 6, wherein the auxiliary factor is at least partially based on the gathered attributes.

8. The system claim 1, wherein the operation instructions are pre-recorded user initiated actions.

9. A method of automating software testing, the method comprising:

determining whether a plurality of anchor points are triggered in response to input from a current operation within operation instructions, the plurality of anchor points representing a plurality of modules within the application instructions of an application wherein the plurality of modules process a plurality of types of input;

if the plurality of anchor points are triggered, selecting one of the triggered anchor points that has a highest impact on a synchronicity between the current operation and one or more subsequent operations in the operation instructions based on a percent probability the one anchor point will be triggered on recurring executions of the application to process a first type of input of the plurality of inputs associated with the one anchor point; and generating instructions that configure a processor to pause, after the current operation completes, until the selected one anchor point completes, before advancing to the one or more subsequent operations.

10. The method of claim 9, wherein each of the plurality of anchor points is associated with a coherency factor, the coherency factor representing the percent probability that the associated anchor point will be triggered in response to the recurring executions of the application.

11. The method of claim 10, wherein selecting one of the triggered anchor points comprises:
determining an auxiliary factor for each of the triggered anchor points, the auxiliary factor representing a reliance by the one or more subsequent operations on the associated anchor point, such that the one or more subsequent operations cannot begin until the associated anchor point is complete;
using the coherency factor and the auxiliary factor of each of the triggered anchor points to calculate a weight for each triggered anchor point; and
wherein the selecting the one anchor point that has a highest impact on a synchronicity occurs when the one anchor point has a highest weight of the triggered anchor points.

12. The method of claim 11, further comprising gathering attributes associated with the triggered anchor points, the auxiliary factor being at least partially based on the gathered attributes.

13. The method of claim 12, wherein the attributes comprise timing information associated with each of the triggered anchor points.

14. The method of claim 9, wherein the operation instructions are pre-recorded user initiated actions.

15. A non-transitory computer readable medium having instructions therein that implement a method of automating software testing, the method comprising:

determining whether a plurality of anchor points within application instructions are triggered in response to input from a current operation within operation instructions, the plurality of anchor points associated with a plurality of coherency factors representing a probability that an associated anchor point will be triggered in response to repeated executions of the operation instructions;

calculating a plurality of weights for the plurality of anchor points based on the plurality of coherency factors, a first weight of the plurality of weights representing a particular impact on synchronicity of a first anchor point of the plurality of anchor points between the current operation and subsequent operations;

if the plurality of anchor points are triggered, selecting the first anchor point when the first weight has a highest impact on a synchronicity between the current operation and the subsequent operations in the operation instructions among the plurality of weights; and generating instructions that configure a processor to pause, after the current operation completes, until the first anchor point completes, before advancing to the subsequent operations.

16. The computer readable medium of claim 15, wherein selecting the first anchor point comprises:
determining a plurality of auxiliary factors for the plurality of anchor points, a first auxiliary factor of the plurality of auxiliary factors representing a reliance by the subsequent operations on the first anchor point, such that the subsequent operations cannot begin until the first anchor point is complete; and
using the coherency factor and the auxiliary factor of each of the plurality of anchor points to calculate the plurality of weights.

17. The computer readable medium of claim 16, further comprising gathering attributes associated with the plurality of anchor points, the attributes comprise timing information associated with the plurality of anchor points, the plurality of auxiliary factors being at least partially based on the gathered attributes.

18. The computer readable medium of claim 15, wherein the operation instructions are pre-recorded user initiated actions.

19. The computer readable medium of claim 15, further comprising:
storing associations between the plurality of anchor points nd the plurality of weights in an anchor point table.

20. The system of claim 1, further comprising:
an anchor point database coupled to the processor, the anchor point database to store an association between the one anchor point and the coherency factor.

* * * * *